(12) United States Patent
Huelke

(10) Patent No.: US 9,610,904 B2
(45) Date of Patent: Apr. 4, 2017

(54) PUSH PIN WITH OVER-TRAVEL STOP

(75) Inventor: David R. Huelke, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 254 days.

(21) Appl. No.: 13/584,178

(22) Filed: Aug. 13, 2012

(65) Prior Publication Data

US 2014/0041164 A1 Feb. 13, 2014

(51) Int. Cl.
*F16B 19/00* (2006.01)
*B60R 13/02* (2006.01)
*F16B 21/08* (2006.01)
*F16B 5/06* (2006.01)

(52) U.S. Cl.
CPC ........ *B60R 13/0206* (2013.01); *F16B 21/086* (2013.01); *F16B 5/065* (2013.01); *Y10T 24/44026* (2015.01)

(58) Field of Classification Search
CPC ...... F16B 21/084; F16B 21/08; F16B 5/0642; F16B 19/004; F16B 21/086
USPC ..................................... 411/508–510; 24/297
See application file for complete search history.

(56) References Cited

U.S. PATENT DOCUMENTS

| | | | |
|---|---|---|---|
| 3,481,242 A * | 12/1969 | Topf .............................. | 411/502 |
| 3,889,320 A * | 6/1975 | Koscik ................ | B60R 13/0206 24/297 |
| 4,396,329 A | 8/1983 | Wollar | |
| 4,568,215 A * | 2/1986 | Nelson .......................... | 411/510 |
| 4,938,645 A * | 7/1990 | Wollar .................... | F16B 21/08 411/508 |
| 5,056,199 A * | 10/1991 | Stein et al. ................... | 24/682.1 |
| 5,232,322 A * | 8/1993 | Regensburger ............... | 411/510 |
| 5,368,261 A * | 11/1994 | Caveney et al. ............... | 248/73 |
| 5,373,611 A * | 12/1994 | Murata ............... | B60R 13/0206 24/289 |
| 5,875,735 A * | 3/1999 | Bradley ............... | A01K 15/024 119/706 |
| 5,980,230 A | 11/1999 | Dowd et al. | |
| 6,761,411 B2 | 7/2004 | Burr et al. | |
| 6,804,864 B2 * | 10/2004 | Kirchen ................ | F16B 5/0642 24/289 |
| 7,017,969 B1 * | 3/2006 | Kirkham ............... | B60R 13/011 296/39.1 |
| 7,185,941 B2 | 3/2007 | Klein et al. | |
| 7,503,528 B2 * | 3/2009 | Adams et al. .................. | 248/71 |
| 7,547,061 B2 | 6/2009 | Horimatsu et al. | |
| 7,614,836 B2 * | 11/2009 | Mohiuddin et al. .......... | 411/510 |
| 7,793,895 B2 * | 9/2010 | Franks .......................... | 248/74.3 |
| 8,261,926 B2 * | 9/2012 | Bradley ................ | H02G 3/121 220/241 |
| 8,533,919 B2 * | 9/2013 | Schliessner ...................... | 24/458 |
| 8,601,649 B2 * | 12/2013 | Klein et al. .................... | 24/457 |
| 2003/0230044 A1 * | 12/2003 | Peterson ...................... | 52/716.5 |
| 2005/0242247 A1 * | 11/2005 | Geiger ......................... | 248/74.3 |

(Continued)

*Primary Examiner* — Gary Estremsky
(74) *Attorney, Agent, or Firm* — Vichit Chea; Price Heneveld LLP

(57) ABSTRACT

A one piece push-in fastener for insertion through a hole includes a head, and an elongate shank extending from the head and terminating in a tip. The fastener also includes a shoulder spaced from the head and extending radially outward from the shank, and a plurality of spaced ribs extending radially outward from the shank and disposed along a length of the shank between the shoulder and the tip. A diameter of the head is greater than a diameter of the shoulder.

18 Claims, 1 Drawing Sheet

(56) References Cited

U.S. PATENT DOCUMENTS

2007/0134073 A1* 6/2007 Shereyk et al. ............. 411/510
2009/0191025 A1* 7/2009 Jackson, Jr. ................. 411/510
2011/0035909 A1* 2/2011 Moberg ........................ 24/289

* cited by examiner

PUSH PIN WITH OVER-TRAVEL STOP

FIELD OF THE INVENTION

The present invention generally relates to a push-in fastener, and more particularly to a push-in fastener having an over-travel stop.

BACKGROUND OF THE INVENTION

The body structure of a vehicle roof typically includes a roof panel and several roof headers and bows, which are closed-section or channel-shaped structures secured to the vehicle body that extend along the length and across the width of the vehicle roof to provide support for the roof panel. A headliner is normally attached to the interior side of the roof structure to provide an attractive appearance for the interior of the vehicle. Headliners have been attached to the roof of vehicles in a variety of manners, including using screw or snap-in fasteners, adhesives, magnets, and hook and loop type fasteners such as VELCRO.

SUMMARY OF THE INVENTION

One aspect of the present invention includes a one piece push-in fastener for insertion through a hole. The fastener includes a head, and an elongate shank extending from the head and terminating in a tip. The fastener also includes a shoulder spaced from the head and extending radially outward from the shank, and a plurality of spaced ribs extending radially outward from the shank and disposed along a length of the shank between the shoulder and the tip. Additionally, a diameter of the head is greater than a diameter of the shoulder.

Another aspect of the present invention includes a one piece push-in fastener for affixing a first mounting member to a second mounting member. The fastener includes a head, and an elongate shank extending from the head and terminating in a tip. The fastener further includes a shoulder spaced from the head and extending radially outward from the shank, and a plurality of spaced ribs extending radially outward from the shank and disposed along a length of the shank between the shoulder and the tip. The shoulder abuts the second mounting member when the fastener is inserted through an aperture in the first mounting member to affix the first mounting member to the second mounting member, the shoulder preventing over-insertion of the fastener into an aperture in the second mounting member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
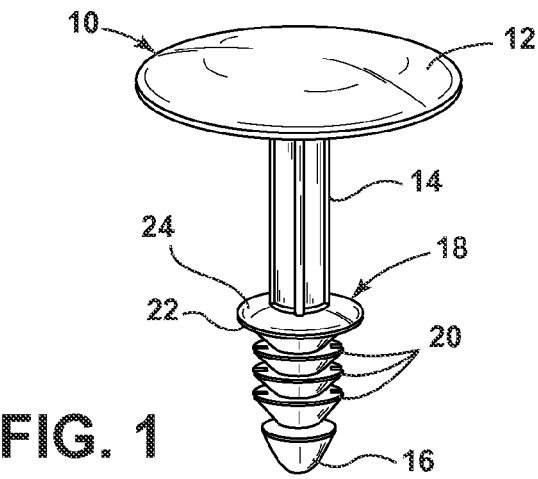
FIG. 1 is a top perspective view of a fastener according to one embodiment.
Figure 2:
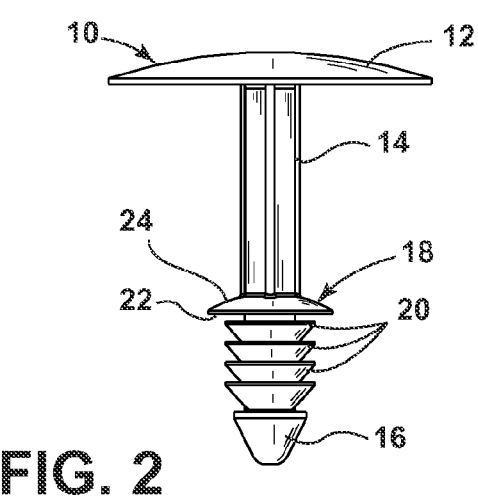
FIG. 2 is a side view of the fastener of FIG. 1.
Figure 3:
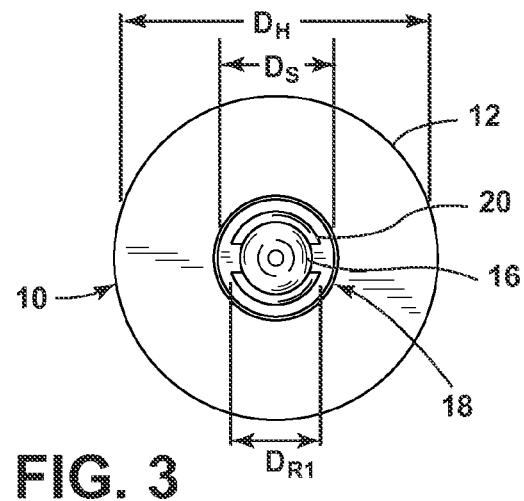
FIG. 3 is a bottom view of the fastener of FIG. 1.

For purposes of description herein, the terms "upper," "lower," "right," "left," "rear," "front," "vertical," "horizontal," "interior," "exterior," and derivatives thereof shall relate to the push-in fastener as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a one piece push-in fastener. The fastener 10 includes an enlarged head 12 and an elongate shank 14 that extends from the head 12. The shank 14 is relatively rigid and terminates in a tip 16. The fastener 10 also includes a shoulder 18 that is spaced from the head 12 and extends radially outward from the shank 14. Further, a plurality of spaced ribs 20 extend radially outward from the shank 14 and are disposed along a length of the shank 14 between the shoulder 18 and the tip 16. A diameter $D_H$ of the head 12 is greater than a diameter $D_S$ of the shoulder 18.

The head 12 is illustrated as an enlarged, somewhat domed member; however, the head 12 could be any variety of suitable shapes or styles. The shank 14 has a generally circular cross section, though may include support ribs, or grooves. According to another embodiment, the shank 14 may have a generally cruciform or other shaped cross section.

The shoulder 18 is integral to and circumscribes the shank 14. In the illustrated embodiment, the shoulder 18 is shown as being slightly frustoconical; however, other shapes are also contemplated in other embodiments, for example, a flat circinate member. Additionally, the shoulder 18 includes a lower stop surface 22 and an opposite tapered surface 24.

The plurality of ribs 20 is also integral with the shank 14. In the illustrated embodiment, the fastener 10 includes four spaced ribs 20; however, more or fewer ribs are also contemplated, as needed for each practical application. The ribs 20 extend radially outward from the shank 14 and are slightly tapered inward, toward the tip 16. The ribs 20 are disposed between the shoulder 18 and the tip 16, leaving the length of the shank 14 between the shoulder 18 and the head 12 absent of ribs 20. Additionally, the ribs 20 are configured to have the ability to flex inward, at least slightly, toward the shank 14.

The diameter $D_H$ of the head 12 is greater than the diameter $D_S$ of the shoulder 18, which in turn is greater than a diameter $D_R$ of the ribs 20.

Figure 4:
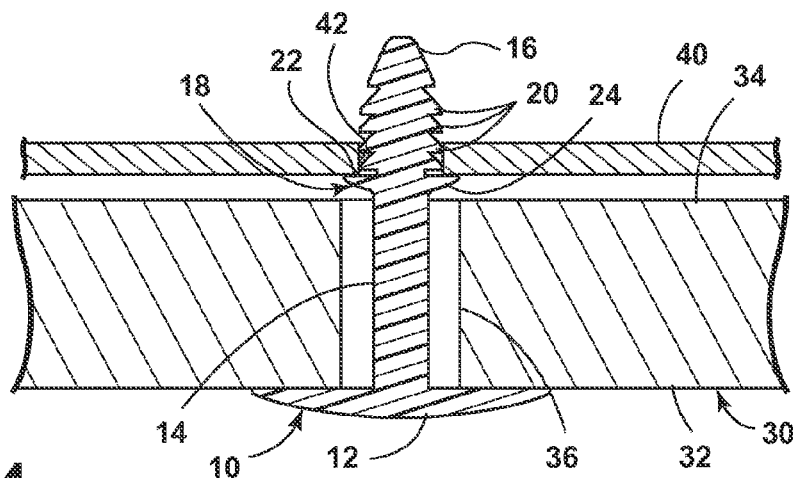
FIG. 4 is a cross-sectional side view of the fastener assembled to a portion of a headliner and a roof structure in a vehicle, according to another embodiment.

Referring now to FIG. 4, the fastener 10 can be used to couple and fasten a first member 30 to a second member 40. The fastener 10 can be used in a vehicle attachment system for mounting a trim component, such as a headliner, to a body structure of an automotive vehicle. In the illustrated embodiment, the first member 30 is shown in the form of a headliner; however, other trim components, including pillar trim, interior panels, and the like are contemplated according to other embodiments. Further, the second member 40 is shown in the form of a roof structure; however, other body structures, including pillars, body panels, and the like are contemplated.

The headliner 30 may be a formed and molded headliner for mounting to the interior of the roof structure 40 of the vehicle, so as to provide an aesthetically pleasing appearance for the interior thereof. The headliner 12 has an exterior surface 32 which faces the supporting roof structure 40 when installed in the vehicle, and an opposite, interior surface 34 that is upholstered to provide a decorative surface visible from the interior of the vehicle. The headliner 30 is shaped to conform to the roof structure 40 and may include a plurality of contours and apertures for mounting various overhead components, such as sun visors, overhead consoles, grab handles, lights, and the like. Additionally, the headliner 30 may be a yielding, less than rigid member. The roof structure 14 includes spaced side rails, and at least a front header, a rear header, and may also include additional roof bows, as is conventional. Further, the headliner 30 includes an aperture 36, and the roof structure 40 includes an aperture 42, which the fastener 10 extends into.

During assembly of the vehicle, the headliner 30 is positioned in alignment for installation, and the headliner aperture 36 and the roof structure 40 are generally aligned. The fastener 10 is inserted into the headliner aperture 36, and the ribs 20 engage a periphery of the roof structure aperture 42 when inserted thereinto. In the installed position, the shank 14 is disposed within the headliner aperture 36, and the ribs 20 engage the roof structure aperture 42, thereby retaining the fastener 10 and the headliner 30 to the roof structure 40. Accordingly, the diameter $D_R$ of the ribs 20 and a diameter of the roof structure aperture 42 are designed to be complementarily sized. Further, the ribs 20 are not sufficiently rigid, allowing flexure during insertion of the fastener 10 into the roof structure aperture 42. However, the ribs 20 that engage the periphery of the roof structure aperture 42 resist withdrawal of the fastener 10 therefrom such that the trim component remains fastened to the body structure during normal vehicle use.

The shoulder 18 prevents over-insertion of the fastener 10 into the roof structure aperture 42. More specifically, the stop surface 22 of the shoulder 18 abuts the roof structure 40 when the fastener 10 is fully inserted into the roof structure aperture 42. Contact between the stop surface 22 and the roof structure 40 prevents the fastener 10 from being inserted further into the roof structure aperture 42. When the fastener 10 is used for mounting the headliner 30 to the roof structure 40, the shoulder 18 prevents the fastener 10 from being over-inserted, which can cause the non-rigid headliner 30 to bend, buckle, crease, or form other undesirable deformation.

The relative sizing described herein ensures that the fastener 10 properly retains the headliner 30 to the roof structure 40. For example, the diameter $D_H$ of the head 12 is designed to be greater than a diameter of the headliner aperture 36, to ensure that the headliner aperture 36 is not visible from within the vehicle interior. Also, a distance between the shoulder 18 and the head 12 (and therefore that portion of the length of the shank 14) is configured to position the headliner 30 at the desired location, relative to the roof structure 40.

It is contemplated that the fastener 10 can be formed by injection molding, and can be made of a thermoplastic material; for example, nylon, acetal, or any other suitable injection moldable plastic material.

It will be understood by one having ordinary skill in the art that construction of the described attachment system and other components is not limited to any specific material. Other exemplary embodiments of the invention disclosed herein may be formed from a wide variety of materials, unless described otherwise herein.

It is also important to note that the construction and arrangement of the elements of the fastener as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

I claim:

1. An automotive assembly, comprising:
   a first trim component defining an outer surface, an inner surface, and a first aperture extending between the outer surface and the inner surface;
   a first vehicle body structure having a first surface and a second aperture therein; and
   a one-piece, push-in fastener, comprising:
      a head;
      an elongate shank extending from the head and terminating in a tip;
      a unitary, disc-shaped shoulder extending radially outward from the shank with a first portion of the shank extending between the head and the shoulder such that the shoulder is spaced apart from the head, the shank comprising a generally solid cylindrical member at least within the first portion, and a second portion of the shank extending between the shoulder and the tip;
      a plurality of support ribs spaced radially around the first portion of the shank only and extending through a length thereof; and
      a plurality of spaced ribs extending radially outward directly from and beyond the shank and disposed along a length of the shank between the shoulder and the tip;
   wherein the second portion of the shank is received in the second aperture with the shoulder of the fastener abutting the surface of the first vehicle body structure, the fastener passing through the first aperture with the head of the fastener overlying a portion of the outer surface adjacent the first aperture without compressing the first trim component.

2. The automotive assembly of claim 1, wherein:
the head is a disc shaped body extending radially outward from a junction thereof with the shank, the disc shaped body defining a generally smooth, convex outer surface; and
a diameter of the head is greater than a diameter of the shoulder.

3. The automotive assembly of claim 2, wherein the diameter of the shoulder is greater than a diameter of the plurality of ribs.

4. The automotive assembly of claim 1, wherein the first trim component is disposed between the head and the shoulder, and the first vehicle body structure is disposed between the shoulder and the tip of the shank.

5. The fastener of claim 1, wherein the first trim component comprises a headliner and first vehicle body structure comprises a roof structure.

6. The automotive assembly of claim 5, wherein the headliner is disposed between the head and the shoulder, and the roof structure is disposed between the shoulder and the tip of the shank.

7. The automotive assembly of claim 1, wherein the shoulder comprises a stop surface and an opposite, tapered surface.

8. The automotive assembly of claim 7, wherein the spaced ribs are tapered toward the tip.

9. The automotive assembly of claim 8, wherein the spaced ribs are not rigid to allow flexure during insertion of the fastener into the second aperture.

10. The automotive assembly of claim 9, wherein the spaced ribs engage the second aperture to resist withdrawal of the fastener therefrom.

11. An automotive assembly, comprising:
a headliner defining an outer surface, an inner surface, and a first aperture extending between the outer surface and the inner surface;
a roof structure having a first surface and a second aperture therein; and
a one-piece push-in fastener, comprising:
a head;
an elongate shank extending from the head and terminating in a tip;
a shoulder of a solid, frustroconical shape widening in a first direction and extending radially outward from the shank with a first portion of the shank extending between the head and the shoulder such that the shoulder is spaced apart from the head and a second portion of the shank extending between the shoulder and the tip; and
a plurality of spaced ribs extending radially outward from and beyond the shank and disposed along the second portion of the shank, each of the ribs comprising a pair of solid, frustroconical sections widening only in a second direction opposing the first direction;
wherein a diameter of the head is greater than a diameter of the shoulder;
wherein the second portion of the shank is received in the second aperture with the shoulder of the fastener abutting the surface of the roof structure, the fastener passing through the first aperture with the head of the fastener overlying a portion of the outer surface adjacent the first aperture without compressing the headliner.

12. The automotive assembly of claim 11, wherein pairs of solid frustoconical sections comprising the each of the ribs together surround a majority of the shank.

13. The automotive assembly of claim 11, wherein the diameter of the shoulder is greater than a diameter of the plurality of ribs.

14. The automotive assembly of claim 13, wherein the shoulder comprises a stop surface and an opposite, tapered surface.

15. The automotive assembly of claim 14, wherein the spaced ribs are tapered toward the tip.

16. The automotive assembly of claim 15, wherein the ribs are not rigid to allow flexure during insertion of the fastener into the second aperture.

17. The automotive assembly of claim 16, wherein the ribs engage a periphery of the second aperture to resist withdrawal of the fastener therefrom.

18. The automotive assembly of claim 11, wherein the shoulder abutting the roof structure prevents over-insertion of the fastener into the second aperture.

* * * * *